Feb. 14, 1961 R. C. MINNICK 2,972,130
MAGNETIC CORE STORAGE CIRCUIT
Filed April 19, 1957 2 Sheets-Sheet 1

INVENTOR
R. C. MINNICK
BY
ATTORNEY

Feb. 14, 1961 R. C. MINNICK 2,972,130
MAGNETIC CORE STORAGE CIRCUIT
Filed April 19, 1957 2 Sheets-Sheet 2
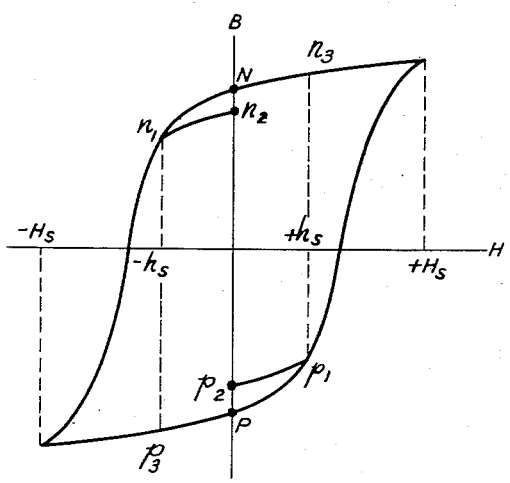
INVENTOR
R. C. MINNICK
BY
ATTORNEY

United States Patent Office 2,972,130
Patented Feb. 14, 1961

2,972,130

MAGNETIC CORE STORAGE CIRCUIT

Robert C. Minnick, Cambridge, Mass., assignor to Bell Telephone Laboratories, Incorporated, New York, N.Y., a corporation of New York Filed Apr. 19, 1957, Ser. No. 653,771

5 Claims. (Cl. 340—174)

This invention relates to magnetic core storage systems and more particularly to the arrangement of information storage and retrieval circuitry in such systems.

A type of magnetic core storage matrix well known in the art employs an arrangement of cores in electrical coincidence with a geometrical array of rows and columns. A grid of selecting wires and a sensing wire is used to provide conductive paths for information storage and retrieval. Each selection wire is inductively coupled to or threaded through each of the cores in an associated row or column. The sensing wire is threaded through all of the cores. No two selection wires jointly thread more than a single core. Information is read into a designated core by pulsing with a signal of like polarity each of the selecting wires threading that core. The strength of the combined signal is such that through inductive coupling between the wire and the core, the core is driven to magnetic saturation in a direction corresponding to the polarity of the signal. Retrieval of the information stored in a designated core is accomplished by again pulsing the selecting wires associated with that core. A change in the magnetic state of the core will induce an output signal in the sensing wire. If there is no change in state, the polarity of the pulsing signal obviously corresponds to the direction of magnetic saturation and little or no signal is induced in the sensing wire.

One of the major limiting factors in storage systems of the type described is the presence of disturbing signals on the common sensing or output wire. Although the interrogating pulse occurring in a single selection wire is insufficient to reverse the magnetic state of any of the non-selected cores on the pulse carrying wire, some shift in magnetic state does occur, resulting in an induced spurious output signal on the sensing wire. If the sensing wire is inductively coupled to each core in the same direction, these spurious signals will be additive and will mask the signal emanating from the core being sensed.

A number of arrangements disclosed in the prior art tend to reduce the masking effect of these spurious output signals. For example, by alternating the direction in which the sensing wire is coupled to each successive core, the spurious signals will alternate in polarity and partial cancellation will occur. Another arrangement teaches threading each core with a number of wires, no two wires threading more than a single core, and applying to each wire an equal part of the setting current desired. In this fashion the ratio of the output signal to the spurious signals is increased. Still another proposal is the use of dummy cores together with biasing coils. This problem is further discussed in my Patent 2,732,542, issued on January 24, 1956.

The teaching of alternating the core coupling direction of the common sensing wire leads to the theoretical conclusion that the total number of spurious signals, signals not canceled by others of opposite polarity, is independent of the matrix size. For example, it can be shown, theoretically, that in a matrix of $n \times n$ cores on a side, where a spurious signal is designated by $+1$, $-1$, or $0$ according to its polarity and magnitude, the total number of unbalanced, spurious signals is in the range of $\pm 2$ for even $n$ and $\pm 4$ for odd $n$. However, the idealization of spurious signals to $+1$, $-1$ or $0$ is not in accord with observation. The total disturbance on the output wire does increase with $n$. The primary reason for this increase is the known fact that the spurious signal produced from a given core storing a signal of one polarity differs from the spurious signal from a core storing a signal of opposite polarity. Some degree of asymmetry is present in all but an idealized hysteresis loop. Even in a hysteresis loop that is ideally symmetric, the curvature of the curve at the top of the loop differs from that at the bottom of the loop. Consequently, a difference can be observed between the flux change that occurs in each of two cores in opposite states of saturation when subjected to the same disturbing signal. Moreover, this variation will occur even between two cores of identical magnetic properties. Therefore, exact cancellation of spurious signals will not occur through alternating the coupling direction of the sensing wire, and arrangements in the prior art have not been directed toward this specific problem.

It is an object of this invention to provide improved magnetic core circuits.

It is a more specific object of this invention to reduce to a minimum the spurious output signals produced by non-selected cores in the read-out signal of magnetic core circuits.

It is a further object of this invention to provide an optimum ratio in a magnetic core circuit between the readout signal resulting from sensing the information stored in a designated core and the read-out signals resulting from non-selected cores.

It is a still further object of this invention to provide a read-out arrangement wherein the magnitude of spurious signals is independent of the number of cores in the matrix.

These and other objects of this invention are realized with a minimum amount of associated circuitry in a specific embodiment wherein a magnetic core matrix is made up of a number of groups of cores, each group containing a major core and a number of minor cores. In storing a given information signal, the signal is applied equally by means of major and minor selecting wires to all of the cores of a designated group. All of the cores in the group are thus driven to the same state of magnetic saturation. In a conventional array each core of the matrix is in one or the other of the two possible states of saturation. In accordance with the principles of the invention, each group of cores is in one or the other of the two possible saturated states. Further, in accordance with the principles of the invention, read-out is achieved by pulsing only the major selecting wires. In any given group, major selecting wires thread the major core and at least some of the minor cores whereas the minor selecting wires thread only the minor cores. By threading the sensing wire in accordance with a particular pattern, to be described in detail later herein, substantial cancellation of spurious output signals is achieved. The final magnitude of the sum total of the uncanceled spurious signals is thereby made independent of the number of cores in the matrix.

In a second embodiment of the invention an arrangement similar to the first embodiment is employed wherein the use of additional major wires, coupled to major cores so that no two major wires are jointly coupled to the same core, results in an improved ratio between the read-out signal and the remaining unbalanced spurious signals.

It is therefore one feature of this invention that a magnetic core matrix have a number of distinct groups of cores, each group containing one major core and at least two minor cores.

It is a further feature of this invention that a matrix have major selecting wires threading major cores and minor selecting wires threading only minor cores.

It is a still further feature of this invention that the storage of a given signal be accomplished by storing that signal in all the cores of a designated group.

It is a still further feature of this invention that the read-out of a signal be accomplished by sensing only the major core of a group.

A complete understanding of this invention together with additional objects and features thereof will be gained from consideration of the following detailed description and accompanying drawings in which:

Fig. 3 shows the relative polarities of the inductive coupling between the selection wires and the cores in a group magnetic core matrix illustrative of still another embodiment;

Fig. 4 shows the relative polarity of possible disturbing signals at each core in the illustrative group matrix of Fig. 3; and Fig. 5 shows a hysteresis loop, illustrating the theory supporting one of the principles of the invention.

Figure 1:
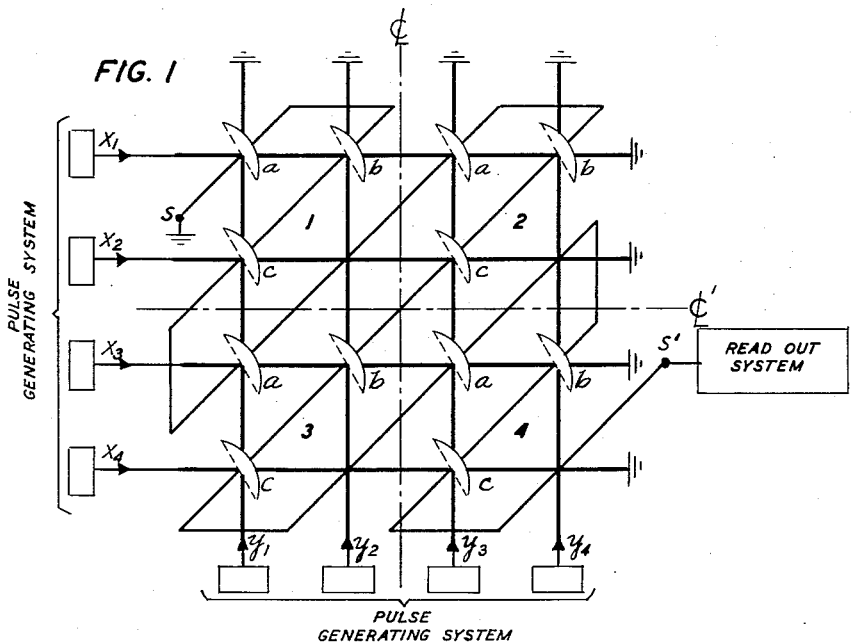
Fig. 1 shows schematically a group magnetic core matrix in accordance with one specific embodiment of this invention wherein each group comprises three cores.

Referring to Fig. 1, for the purpose of illustrating the principles of this invention, only a 2 x 2 group matrix is shown comprising core groups 1, 2, 3 and 4. The groups are separated, for purposes of identification, by dotted lines CL and C'L'. Each of the four core groups comprises three cores $a$, $b$ and $c$, each core being represented by a circular segment, the arc of the segment being solid and the chord broken. In each group, $a$ represents the major core and $b$ and $c$ represent minor cores. Lines $x_1$, $x_2$, $x_3$ and $x_4$ and lines $y_1$, $y_2$, $y_3$ and $y_4$ are selecting wires. Any wire passing through a major core is a major selecting wire. Any wire passing through only minor cores is a minor selecting wire. Hence, in Fig. 1, wires $x_1$, $x_3$, $y_1$ and $y_3$ are major selecting wires and $x_2$, $x_4$, $y_2$ and $y_4$ are minor selecting wires. The line SS' represents a sensing wire threaded through or otherwise inductively coupled to each core in the matrix. The relative direction in which the sensing wire or a selecting wire is coupled to cores in the matrix may be determined by tracing any selecting wire or the sensing wire in the direction indicated by one of the small arrows. One direction of coupling is indicated by a wire first intersecting a core through its dotted chord, that is to say, a wire which in coupling any particular core follows a path marked by source→chord→arc→ground. This direction of coupling may be conveniently designated as the "1" direction, not to be confused with any state of magnetization, which may be similarly designated. With this convention, each of the cores of Fig. 1 is coupled to its associated pair of selecting wires in the 1 direction. Tracing the sensing wire of Fig. 1 in the direction from S toward S', it will be noted that core $a$ of group 1 is coupled in the chord→arc or 1 direction and that cores $b$ and $c$ of group 1 are coupled in the opposite direction; i.e., arc→chord. This opposite direction of coupling may be conveniently designated as the "0" direction, not to be confused with any state of magnetization which may be similarly designated. The opposite direction of coupling is indicated by a wire first entering a core through its solidly drawn arc.

As noted hereinabove, it can be shown, theoretically, that for any conventional matrix of $n$ x $n$ cores on a side, where the direction of coupling of the sensing wire alternates from core to core, and where the spurious signal generated at a non-selected core is designated +1 or −1 according to its polarity, the total number of unbalanced spurious signals is in the range of ±2 for even $n$ and ±4 for odd $n$.

However, in view of the fact that the spurious signal produced from a given core storing a signal of one polarity differs from the spurious signal from a core storing a signal of opposite polarity, even where the coupling between each core and the sensing wire is in the opposite direction, ±2 or ±4 does not accurately represent the range of the total value of unbalanced signals. This fact may best be illustrated by reference to the hysteresis loop shown in Fig. 5. The loop shown, having a relatively high degree of rectangularity, is representative of the magnetic characteristics of the type of core employed in magnetic storage matrices. Point P represents the magnetic state of the core storing a binary 1 and point N represents the magnetic state of the core when a binary 0 is stored, assuming full saturation in each case. Minimum values of disturbing fields required to reverse the magnetic state of the core from one extreme of saturation to the other are represented by points $+H_s$ and $-H_s$. Lesser values of disturbing fields, for example those occurring in a non-selected core from interrogating pulses in a matrix such as that shown in Fig. 1, are represented by the points $+h_s$ and $-h_s$. An interrogating pulse creating a disturbing field of the value $+h_s$ will result in an excursion of the state of magnetization as shown by the minor hysteresis loop $Pp_1p_2$ if the core was initially at point P and, if the core was initially at point N, the core will shift from N to $n_3$ and then back to N. Similarly, an interrogating pulse creating a disturbing field of the value $-h_s$ will result in an excursion of the state of magnetization as shown by the minor hysteresis loop $Nn_1n_2$, if the core was initially at point N, and from point P to $p_3$ and then back to P, if initially at point P. Consequently, if two substantially identical cores, storing opposite binary signals, respectively, were both subjected to the same disturbing field by a single interrogating pulse, the resulting spurious read-out signals induced in the read-out wire would not be equal and opposite and would therefore not cancel. Cancellation does not occur because of the variation which exists in any given core between the curvature of the top of the hysteresis loop and the curvature of the bottom of the loop. For example, the slope or curvature of the loop between points N and $n_3$ and the slope or curvature of the loop between points P and $p_1$ are not the same. This variation of slope will also be observed between the top of the hysteresis loop of one core and the bottom of the loop of any second core even though the magnetic properties of the two cores are substantially identical. Accordingly, the true range of the total value of unbalanced read-out signals in a matrix of the type shown by Fig. 1 may be more precisely indicated by the notation $\pm(2+n\epsilon)$ for even $n$ and $\pm[4+(n+1)\epsilon]$ for odd $n$, where $\epsilon$ represents the uncanceled portion of spurious signals emanating from non-selected cores, $\epsilon$ being greater than 0.

Following now the operation of the magnetic core matrix of Fig. 1, let us assume that the storage of a pulse designated 1 is desired, employing the binary convention of 0 and 1 to indicate information bits. This storage is accomplished by the transmission of a pulse signal of the appropriate polarity over wires $x_1$, $x_2$, $y_1$ and $y_2$. The strength of the signal transmitted is advantageously one-half that needed to saturate any given core in the 1 direction. Thus, regardless of the remanent state of magnetic saturation in any of the cores $a$, $b$ or $c$ of group 1 before the selecting wires were energized, at the conclusion of the energizing signal each of the cores will be driven to magnetic saturation in the 1 direction. The storage of the information bit will accordingly have been made in all of the cores of a group rather than in a single core as would have been the case in a conventional n x n magnetic core array where groups of cores are not employed.

It should also be noted that in the process of storing the information bit the only cores driven to saturation in the desired direction were the cores in the designated group 1. This was achieved without the aid of any biasing arrangement but instead was accomplished by the input signal itself. Accordingly, during normal operation, all of the cores in any designated group in the matrix are at one or the other of the two possible states of saturation. The half strength signals transmitted along $x_1$, $x_2$ and $y_1$, $y_2$ were of course insufficient to reverse the state of saturation existing in the cores of group 2 and group 3. The only points at which two energized wires combined to create a full strength signal were at cores $a$, $b$ and $c$ of group 1.

Let us now assume that the interrogation of group 1 is desired in order to produce a read-out signal. This step is accomplished by pulsing major selecting wires $x_1$ and $y_1$ only. If the polarity of the interrogating signal is opposite to that of the stored information bit it is apparent that the state of magnetic saturation in core $a$ of group 1 will be reversed. A full output signal will be induced in selection wire SS'. At the same time, small spurious signals will be induced in the sensing wire at cores $b$ and $c$ of group 1 as a result of the slight shift in magnetic state created by the half amplitude interrogating signal received by core $b$ through $x_1$ and by core $c$ through $y_1$. Since the direction in which the sensing wire is coupled to cores $b$ and $c$ of group 1 is opposite to the sensing wire coupling direction at core $a$, the polarity of these spurious signals will be opposite to that induced at core $a$. Cancellation between the spurious signals will not occur; instead, the disturbances will be additive.

It can readily be seen that spurious signals will also be introduced on the sensing wire SS' by the interrogating pulse in selection wires $x_1$ and $y_1$ at cores $a$ and $c$ of group 3 and at cores $a$ and $b$ of group 2. The direction of inductive coupling between the sensing wire and core $a$ of group 2 is opposite to the direction of inductive coupling of the sensing wire to core $b$ of group 2. Thus, cancellation of these spurious signals will occur. This same cancellation might have taken place in a conventional n x n matrix if the magnetic states of cores $a$ and $b$ of group 2 were the same prior to the interrogating signal. Obviously, such a condition would always be a matter of chance. In accordance with the principles of the invention, however, cores $a$ and $b$ of group 2 will always be in the same magnetic state of saturation, i.e., at one extreme state or the other. The cancellation of spurious signals which takes place is therefore an exact cancellation and will not be effected by the asymmetry of the hysteresis loops or by loop curvature differences. The same complete cancellation of spurious signals which occurred between cores $a$ and $b$ of group 2 will also occur between cores $a$ and $c$ of group 3. The cores of group 4 are of course not involved in the production of spurious signals inasmuch as they were in no way affected by the interrogating signal. It is evident then that the range of spurious output signals in an n x n matrix constructed and operated in accordance with the principles of the invention is ±2 for even values of n and is completely independent of n. It can of course be shown in the same manner that the range of spurious signals for odd values of n is ±4.

It will be recalled that one of the feature of the invention disclosed in connection with the operation of the matrix of Fig. 1, was that in any single core group all of the cores are driven to the same polarity of saturation when a signal is stored. It will be recalled further that only the state of the major core is reversed by the interrogating signal, assuming a polarity opposite to that of the stored signal and the appropriate direction of sensing wire coupling. Interrogation of a major core of course destroys the stored signal when the interrogating signal applied is of opposite polarity. In such a case, the requisite condition of having all of the cores of any selected group saturated in the same direction will not exist until a new storage is effected in that group. It will be apparent to those skilled in the art, however, that pulse generating circuitry responsive to read-out signals from the matrix may be employed advantageously to restore any signal after interrogation has taken place. Such restoring circuitry is known in the art and may comprise other magnetic core matrices, pulse generating electron tube circuitry or other similar arrangements.

Consideration of further embodiments of the principles of the invention will be aided by reference to certain terms and notations which may conveniently be employed to designate the relative directions in which the selecting wires and the sensing wire are coupled to the cores of a magnetic core matrix. As noted above herein, all of the cores of the matrix shown in Fig. 1 are coupled to their associated "selecting wires" in the same direction; i.e., the chord→arc or 1 direction, while the "sensing wire" is coupled to some of the cores in the 1 direction and to others in the 0 direction. We can conveniently and graphically depict these relative wire-to-core coupling directions by arrays of 0's and 1's, the numerals being so disposed that each is placed in the same relative position as the core it represents. Consequently, for the matrix of Fig. 1, the selecting wire core coupling array, termed "selection array," or S array, may be shown as follows:

$$S = \frac{\begin{array}{cc|cc} 1 & 1 & 1 & 1 \\ 1 & & 1 & \end{array}}{\begin{array}{cc|cc} 1 & 1 & 1 & 1 \\ 1 & & 1 & \end{array}} \quad (1)$$

Similarly, the sensing wire-to-core coupling array, conveniently termed "sensing array" or Q array, may be shown as follows:

$$Q = \begin{array}{cccc} 1 & \emptyset & 1 & \emptyset \\ \emptyset & \emptyset & & \\ & 1 & \emptyset & 1 & \emptyset \\ \emptyset & & \emptyset & \end{array} \quad (2)$$

The dotted lines of the Q array (2) are helpful in defining still another term of interest which may be employed to designate one of the features of a magnetic core matrix, arranged in accordance with the invention. If in a Q array each lower-left-to-upper-right diagonal that joins diagonally adjacent core coupling designators defines a line of all 0's or all 1's, it is said to have "threading property." Accordingly, it is apparent that the Q array (2) defining the core matrix of Fig. 1 has threading property.

Further examination of the S array (1) and the Q array (2) of the Fig. 1 matrix shows that in any particular core group, the polarity of possible output signals from the minor cores is opposite to the polarity of a simultaneous output signal from the major core of that group. For example, the major or $a$ core of group 1 is coupled to the selecting wires and also to the sensing wire in the 1 direction. While the minor cores $b$ and $c$ are also coupled to the selecting wires in the 1 direction, they are coupled to the sensing wire in the opposite or 0 direction. Obviously the same result would be attained in a matrix in which the relative coupling directions of the sensing and selecting wires were opposite with respect to any particular major core and the same with respect to the associated minor cores.

These core coupling relationships may be more readily defined by an array of 0's and 1's, similar to the S and Q arrays, where a 1 indicates that the represented core is coupled to the sensing and selecting wires in the same direction and where a 0 indicates opposite coupling directions as between selecting wires and the sensing wire. Such an array is thus a consequence of both the S and Q arrays and it is descriptively designated "product array," or P array. The P array of Fig. 1 appears as follows:

$$P = \begin{array}{|c|c|} \hline -\frac{1}{1}-\ominus- & -\frac{1}{1}-\ominus- \\ \phi & \phi \\ \hline -\frac{1}{1}-\ominus- & -\frac{1}{1}-\ominus- \\ \phi & \phi \\ \hline \end{array} \quad (3)$$

The dotted lines of the P array (3), which correspond to the major selecting wires of Fig. 1, are useful in defining an additional term which may conveniently be employed to describe a magnetic core matrix in accordance with the invention. Every P array that has 1 designators and 0 designators in equal numbers along each major selecting wire in every core group and such designators in unequal numbers along each minor selecting wire in every core group is said to have "cancellation property." Evidently then, the matrix of Fig. 1 is further defined by a P array with cancellation property.

Since in the example above all of the cores are coupled to the selecting wires in the same direction, as indicated by the fact that all the elements of the S array are of the same value, in this case 1, the P array (3) takes the same form as the Q array (2). It is to be understood, however, that the principles of the invention are equally applicable to arrangements in which the selecting wires couple some of the cores in one direction and other cores in the opposite direction.

It should also be noted that a uniform row and column disposition of core elements is not significant insofar as the principles of the invention are concerned. Uniform arrangements, as shown herein, readily illustrate the principles of the invention, but a random core disposition should serve equally well as an embodiment of the features of the invention.

Another term which is helpful in defining the characteristics of core matrices in accordance with the invention is "input selection ratio," $p_i$, which is used to indicate the number of major selecting wires employed for storage input in a single group. For example, for the matrix of Fig. 1, $p_i=2$. A similar term, "output selection ratio," $p_o$, indicates the number of major selecting wires used for the interrogation of a single core group. For example, for the matrix of Fig. 1, $p_o=2$.

Figure 2:
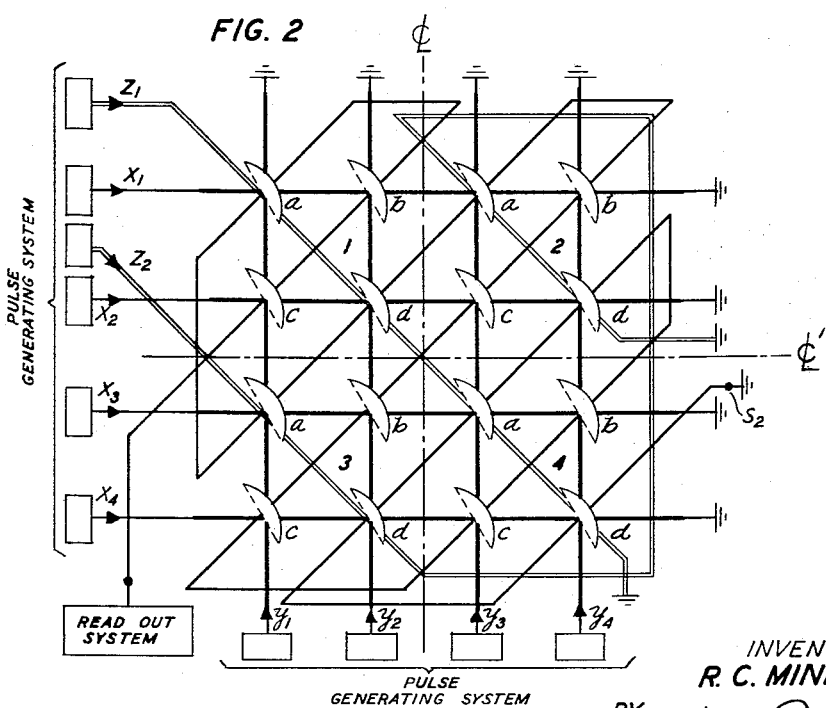
Fig. 2 shows schematically another group magnetic core matrix in accordance with another specific embodiment of this invention wherein each group comprises four cores.

The principles illustrated thus far can be extended to matrix systems having output selection ratios of $p_o > 2$. For example, Fig. 2 shows schematically a 2 x 2 group matrix in which $p_o=3$. Four groups 1, 2, 3 and 4 of cores $a$, $b$, $c$ and $d$ are employed and are separated for identification by dotted lines CL and C'L'. Notations for major and minor selection wires and for the sensing wire are the same as used for Fig. 1 with the exception of the employment of additional major selection wires $z_1$ and $z_2$. To store an information bit in this matrix, for example in core group 1, wires $x_1$, $x_2$, $y_1$ and $y_2$ are energized. The selection ratio for reading in is thus $p_i=2$. To read out of core group 1, major selection wires $x_1$, $y_1$ and $z_1$ are energized, each, advantageously, with a signal strength equal to one-third of that necessary to reverse magnetic saturation in a core. Output selection ratio $p_o$ is thereby increased to 3. The exact cancellation of spurious signals can be traced in the operation of the matrix of Fig. 2 as was done in the matrix of Fig. 1. The selection, output and product arrays of the matrix shown in Fig. 2 may be represented as follows:

$$S = \frac{\begin{array}{|c|c|} 1\,1 & 1\,1 \\ 1\,1 & 1\,1 \\ \hline 1\,1 & 1\,1 \\ 1\,1 & 1\,1 \end{array}} \quad Q = \frac{\begin{array}{|c|c|} 1\,0 & 0\,1 \\ 0\,0 & 1\,1 \\ \hline 0\,1 & 1\,0 \\ 1\,1 & 0\,0 \end{array}} \quad P = \frac{\begin{array}{|c|c|} 1\,0 & 0\,1 \\ 0\,0 & 1\,1 \\ \hline 0\,1 & 1\,0 \\ 1\,1 & 0\,0 \end{array}} \quad (4)$$

It will be noted that the matrix defines a Q array with the threading property and a P array with the cancellation property.

While it has been stated that the cancellation of spurious signals in magnetic arrays constructed and operated in accordance with the principles of the invention is exact, it is still desirable, particularly in the case of larger matrices, to increase the value of the output selection ratio, in the manner illustrated by the matrix of Fig. 2, as the problem of reading information into a magnetic matrix is considerably less critical than that of reading information out. Accordingly, an advantageous arrangement is to maintain the input selection ratio at a value of 2 and to increase the output selection ratio. Such an arrangement will overcome the possible masking effect of relatively minute spurious signals which may be caused by variations in magnetic properties among individual cores in the matrix or by spurious signals induced from outside sources. In this connection it should be noted that the relatively minute spurious signals which may result from a variance in magnetic properties among cores are to be distinguished from the spurious signals resulting from cores of identical magnetic properties wherein the stored signals are of opposite polarity. The latter spurious signals are not present, i.e., exact cancellation occurs, in a matrix constructed and operated in accordance with the principles of the invention.

In order to obtain higher output selection ratios the size of the core group must be increased. An illustration is provided by Fig. 3 showing a selection array and by Fig. 4 which is both the product and output array of a 3 x 3 group matrix with an input selection ratio of 2 and an output selection ratio of 4. The four selection wires in such a matrix may be defined as (0, 1), (1, 0), (1, −1) and (2, −1) where the paired numbers give respectively the horizontal and vertical distance modulo $n$ between cores on the same wire. In the case of the matrix illustrated by the arrays of Fig. 3 and Fig. 4, it will be noted that there are three cores, or a total of seven, added to each core group over those needed for the case illustrated by Fig. 2 in which the output selection ratio was 3. Each core group in the Fig. 3, Fig. 4 example is based on a 5 x 5 matrix. If an $n$ x $n$ matrix contains $m$ x $m$ core groups it can be shown that the output selection ratio is restricted by $$p_o \leq \text{smaller of} \begin{cases} m_0+1 \\ n_0+1 \end{cases} \quad (5)$$

where $m_0$ and $n_0$ are the least prime factors of $m$ and $n$, respectively.

It is to be understood that the above-described arrangements are illustrative of the application of the principles of this invention. Numerous other arrangements may be devised by those skilled in the art without departing from the spirit and scope of the invention.

What is claimed is:

1. In combination, in an information storage system, an even plurality of magnetic cores arranged in a matrix of core groups, each comprising an equal number of at least three of said cores, each of said cores being characterized by a substantially rectangular hysteresis loop and by the capability of attaining either of two stable states of magnetic remanence, means including a plurality of selecting wires, each inductively coupled in a single direction to preassigned ones of said cores, for storing a single information bit in all the cores of any designated one of said groups, means including a selecting wire, said selecting wire being coupled to one half the number of said cores in said single direction and to the other half of said cores in the opposite direction, for reading out said information bit from a single core of said designated group, and means for limiting the magnitude of spurious signals, impressed on said sensing wires during the operation of said reading-out means by cores other than said single core, to a level which is independent of the total number of cores in said matrix, said limiting means comprising a preassigned order of relative coupling directions between said sensing wire and said cores, said order being characterized by threading property in the Q array of said matrix and by cancellation property in the P array of said matrix.

2. In an information storage system, in combination, a matrix of magnetic cores, each characterized by a substantially rectangular hysteresis loop and by the capability of attaining either of two stable states of magnetic remanence, a plurality of major selecting wires, a plurality of minor selecting wires, and a sensing wire, said matrix comprising, a plurality of core groups each including a major core inductively coupled to a respective unique pair of said major selecting wires only and to said sensing wire, and two minor cores each inductively coupled to only one of said major wires, to only one of said minor wires, and to said sensing wire, means for simultaneously applying electrical pulses to all of the major and minor selecting wires coupling the cores of any selected one of said groups, thereby to store a single information bit in said selected group, means for simultaneously applying electrical pulses to any designated pair of major selecting wires jointly coupling a designated major core, thereby to impress a read-out signal on said sensing wire, and means for limiting the total magnitude of spurious read-out signals impressed on said sensing wire by all of the cores, other than said designated major core, which are coupled by said designated major selecting wires, said limiting means comprising a preassigned order of relative coupling directions between said selecting wires and said cores and between said sensing wire and said cores, said order defining a Q array with threading property and a P array with cancellation property.

3. In an information storage system, in combination, a matrix of magnetic cores each characterized by a substantially rectangular hysteresis loop and by the capability of attaining either of two stable states of magnetic remanence, a plurality of major selecting wires, a plurality of minor selecting wires, and a sensing wire, said matrix comprising a plurality of core groups each including a major core inductively coupled to a unique three of said major selecting wires and to said sensing wire and three minor cores each inductively coupled to a respective one of said major wires, to not more than two of said minor wires and to said sensing wire, means for simultaneously applying electrical pulses to the major and minor selecting wires coupling the cores of any selected one of said groups, thereby to store a single information bit in said selected group, means for simultaneously applying electrical pulses to any designated three of said major selecting wires jointly coupling a designated major core, thereby to impress a read-out signal on said sensing wire, and means for limiting the total magnitude of spurious signals impressed on said sensing wire by all of the cores, other than said designated major core, which are coupled by said designated major selecting wires, said limiting means comprising a preassigned order of relative coupling directions between said selecting wires and said cores and between said sensing wire and said cores, said order being characterized by threading property in the Q array of said matrix and by cancellation property in the P array of said matrix.

4. An information storage system comprising, a matrix of $n \times n$ magnetic cores each characterized by a substantially rectangular hysteresis loop and by the capability of attaining either of two stable states of magnetic remanence, at least four major selecting wires, at least four minor selecting wires, and a sensing wire, said matrix comprising at least four groups of said cores, each group comprising an equal number of cores including one major core and at least two minor cores, each major core being inductively coupled, uniquely, to at least two major selecting wires, and each minor core being inductively coupled, uniquely, to one major selecting wire and at least one minor selecting wire, means for simultaneously applying an electrical signal to all of the major and minor selecting wires coupled to the cores of any designated one of said groups, thereby to store the same signal in all the cores of said designated group, means for simultaneously applying an electrical signal to all of the major selecting wires jointly coupling any designated one of said major cores, whereby a read-out signal from said designated major core and a spurious signal from each of the other cores coupled by said last named major selecting wires are impressed on said sensing wire, and means for limiting the total magnitude of said spurious signals to a level which is independent of $n$, said limiting means comprising a preassigned order of relative coupling directions between said selecting wires and said cores and between said sensing wire and said cores, said preassigned order being characterized by a Q array with threading property and a P array with cancellation property.

5. Apparatus in accordance with claim 4 wherein each of said signal applying means includes a respective pulse generator.

References Cited in the file of this patent

UNITED STATES PATENTS

| | | |
|---|---|---|
| 2,691,154 | Rajchman | Oct. 5, 1954 |
| 2,856,596 | Miller | Oct. 14, 1958 |
| 2,881,414 | Haynes | Apr. 7, 1959 |